(12) United States Patent
Tseng et al.

(10) Patent No.: US 6,681,056 B1
(45) Date of Patent: Jan. 20, 2004

(54) METHOD AND SYSTEM FOR DIGITAL IMAGE ACQUISITION AND CONTINUOUS ZOOM DISPLAY FROM MULTIPLE RESOLUTIONAL VIEWS USING A HETEROGENEOUS IMAGE PYRAMID REPRESENTATION

(75) Inventors: Belle L. Tseng, Forest Hills, NY (US); Zon-Yin Shae, South Salem, NY (US); Ferdinand Hendriks, Yorktown Heights, NY (US); Xiping Wang, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,049

(22) Filed: Mar. 30, 1999

(51) Int. Cl.[7] ................................................ G06K 9/20
(52) U.S. Cl. ...................... 382/282; 382/103; 382/284; 382/294; 358/450; 358/540
(58) Field of Search ................................. 382/282, 284, 382/286, 294, 151, 103, 104, 123, 165, 170, 171, 175, 180, 190, 219, 275, 278, 293, 295, 299; 345/115, 435; 355/1.2, 453, 450, 537, 538, 540; 348/576, 580, 584

(56) References Cited

U.S. PATENT DOCUMENTS

| | | | |
|---|---|---|---|
| 5,204,944 A | 4/1993 | Wolberg et al. | |
| 5,568,600 A | 10/1996 | Kaba | |
| 5,649,032 A | 7/1997 | Burt et al. | |
| 5,666,475 A | 9/1997 | Salesin et al. | |
| 5,680,486 A | * 10/1997 | Mita et al. | 382/282 |
| 5,963,664 A | * 10/1999 | Kumar et al. | 382/154 |
| 6,009,197 A | * 12/1999 | Riley | 382/199 |
| 6,173,087 B1 | * 1/2001 | Kumar et al. | 382/130 |

* cited by examiner

*Primary Examiner*—Bhavesh M. Mehta
*Assistant Examiner*—Yosef Kassa
(74) *Attorney, Agent, or Firm*—Scully, Scott, Murphy & Presser; Douglas W. Cameron, Esq.

(57) ABSTRACT

The invention allows a user to construct a collection of resolutionally non-uniform, captured digital image views of static scene, thereby defining the more interesting sections of the scene for viewing. The invention provides a system and a method for continuous zooming and display of composite image representation having different levels of resolution at different locations. The invention discloses techniques for acquisition of multiple resolution and overlapping digital images, composite representation of those captured images, and the continuous zooming display of the complete image data.

42 Claims, 9 Drawing Sheets

METHOD AND SYSTEM FOR DIGITAL IMAGE ACQUISITION AND CONTINUOUS ZOOM DISPLAY FROM MULTIPLE RESOLUTIONAL VIEWS USING A HETEROGENEOUS IMAGE PYRAMID REPRESENTATION

BACKGROUND OF THE INVENTION

1. Field of the Invention

The invention deals with the acquisition, storage and display of image data, and more specifically with the construction of a composite image representation which allows multiple levels of display resolution of selected image locations.

2. Description of Prior Art

To acquire images that allow considerable zooming requires expensive photographic equipment that uses photographic film, followed by scanning of the developed film in to a computer for storage and display. The increasing availability of digital processing has made it feasible to use a method that permits more inexpensive digital capturing devices, such as digital camera. With that method no scanning is necessary, since images may be transferred to the computer via a disk or a direct connection from the digital camera. However, these typically have much lower resolution than photographic film. To make up for this lack of resolution, an author who wishes to convey an impression of a scene would in all likelihood take a picture of the overall scene at low angular resolution, and take additional higher resolution pictures of interesting areas.

The referred to interesting areas do not necessarily imply areas with a large amount of information. For example, a crowd in a stadium when viewed at a large distance while containing much detailed information may still be deemed uninteresting. In business and electronic commerce applications, interesting might mean detail that an advertiser might coax a viewer to uncover after selecting the image region with an interactive input or pointing device such as a PC mouse, e.g., allowing a user to zoom in on an image of cloth.

Furthermore, a common technique of three dimensional computer graphic is texture mapping, where a texture is mapped or pasted onto a three dimensional geometric structure. The texture map is usually a two dimensional image of the three dimensional surface, i.e., image of a surface material, photograph of a face, satellite terrain photos, etc. It is these texture maps that complements the three dimensional models to generate more realistic computer graphic pictures. Hence the higher the spatial resolution of the texture maps, the better the quality of the final rendering. Additionally, most current texture mapping processes are efficiently executed by special graphics display hardware requiring binary levels of resolution of the texture map.

SUMMARY OF THE INVENTION

The invention allows the user to select a collection of resolutionally non-uniform, captured digital image views of a static scene, thereby defining the more interesting sections of the scene. The invention provides a system and a method for continuous zooming and display of composite image representation having different levels of resolution at different locations. The invention comprises techniques for acquisition of digital images, composite representation for multiple resolution and overlapping digital images, and the continuous zooming display of the complete image data. The invention is comprised of the following components:

1. Digital Image Acquisition—a user collects a set of desired digital images or views of the same scene. The collected images may be of different sizes, pixel resolutions, and spatial locations, however they must have some degree of spatial overlap.

First, the capturing device is fixed in the desired position to obtain the best viewpoint of the scene. One image encompassing the whole target scene is obtained. This first image usually results in a fairly low resolution. Then, depending on the areas of interest or importance, higher resolution images of the scene are taken at varying magnification. The camera zoom and rotation may be adjusted to capture the desired images, the camera position however does not change. The resulting collection of images captures the user preferred set of resolutionally non-uniform representations of one scene, with higher resolution images taken of more important sections of the scene, and lower resolution images are taken of less important sections.

2. Image Registration—determines the parameterized transforms from each distortion-corrected digital image to a global coordinate system. Since the camera position of the inventive digital image acquisition system is fixated, the parameterized transforms need only include the spatial offset and resolutional magnification for each image relative to a global coordinate system.

3. Anti-Distortion Image Filter—Image registration does not work well when images are affected by lens distortions, unfortunately nonlinear optical distortions result from most image acquisition devices. Therefore, the anti-distortion image filter is used to calibrate and rectify all the digital input images resulting in a corresponding collection of distortion-corrected digital images.

4. Coding—Each distortion-corrected digital image is compressed for storage.

5. Storage—The collection of compressed distortion-corrected digital images and their corresponding image registration information is stored.

6. Heterogeneous Image Pyramid Representation (HIP) is composed and generated from the collection of distortion-corrected digital images and their corresponding image registration information. The HIP representation maintains and manages the different levels of spatial resolution in different positions, it may be a representation for a data structure or storage.

The HIP representation is a generalization of an image pyramid, it is a continuous volumetric representation where images are sparsely resident anywhere in the pyramid and thus are not confined to quantized levels. Input digital images residing on the heterogeneous image pyramid representation are not confined to specific sizes, pixel resolutions, spatial position, spatial rotation, or spatial transformations.

7. Spatial Transformation performs the desired mapping function between the point data of the HIP representation and the output pixels of the display device.

8. Anti-Alias Image Filter—inserted when spatial image magnification and reduction transforms are performed which makes aliasing artifacts evident.

9. Image Interpolation and Resampling generates any portion of a scene at any level of resolutional magnification, at any spatial location, and at any arbitrary image size from the HIP representation. Since the HIP representation provides only discrete image data at integral positions, an interpolation stage is introduced to construct the continuous surface through the image data. Next, the continuous surface may be resampled at any arbitrary spatial location or rotation.

10. The Display device renders the image output of the image interpolation and resampling process at varying spatial resolution and display size.

Furthermore, it should be noted that the invention is well suited to be used to pre-compute the desired levels of resolutions of texture for texture mapping.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE INVENTION

Figure 1:
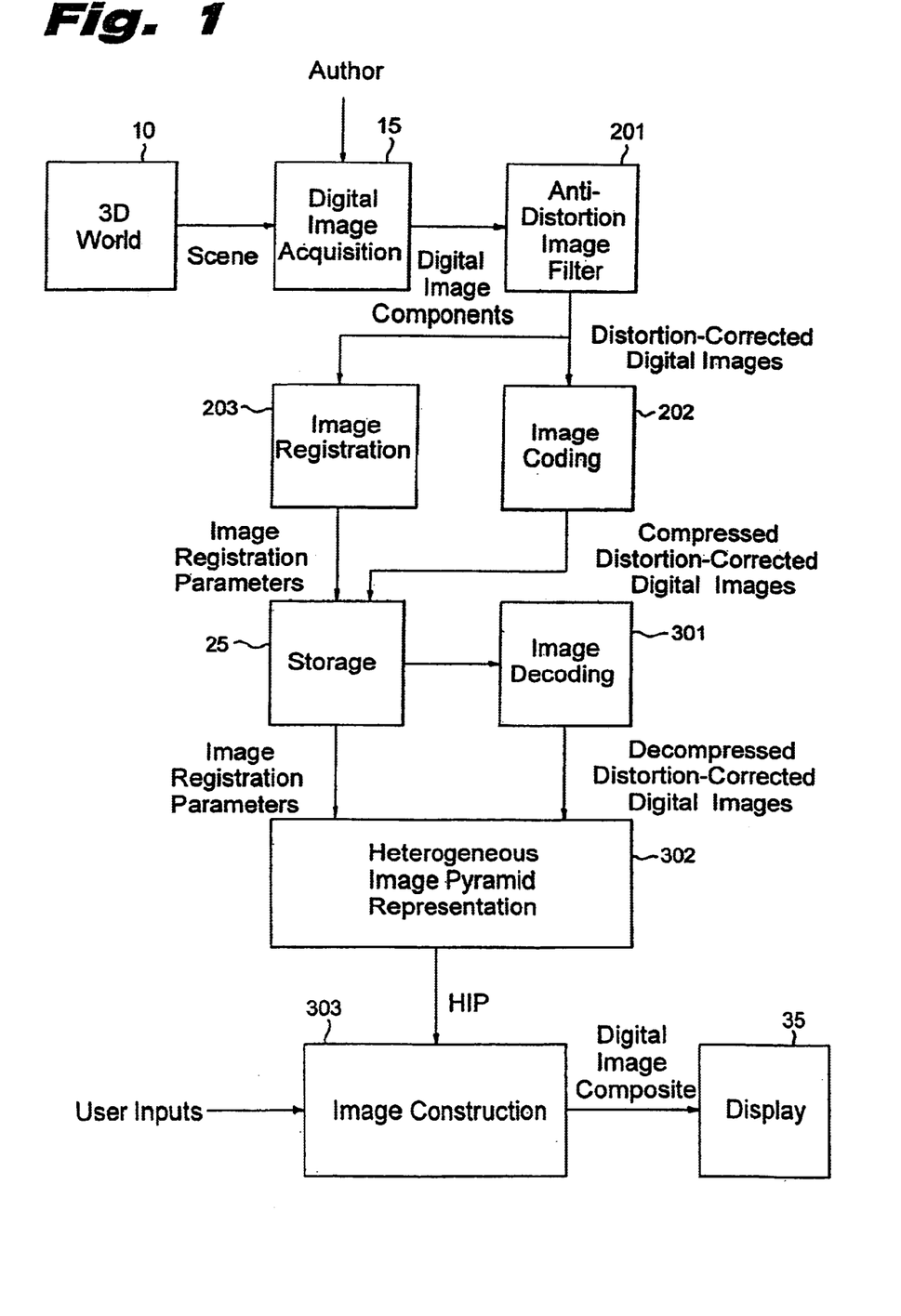
FIG. 1 is a detailed overview block diagram of the inventive system.
Figure 2:
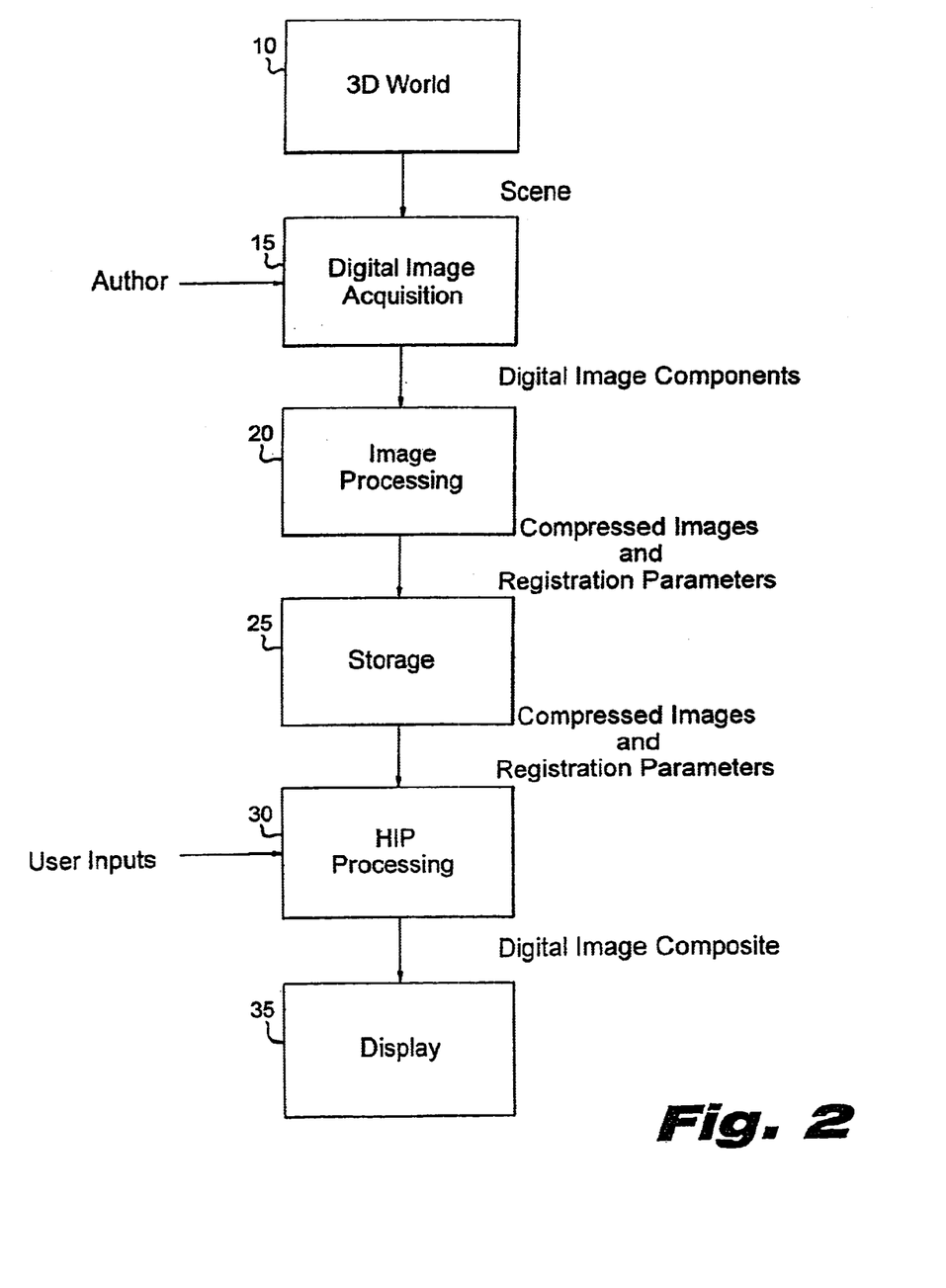
FIG. 2 is an overview block diagram of the inventive system.

The system of the invention is now discussed with reference to FIGS. 1 and 2. FIG. 2, shows steps where 3D World images 10 being captured 15, processed 20 and stored 25, followed by steps of user-dependent processing of the stored data 30 for final rendering of an image on the display 35.

In the 3D World 10, an author selectively captures 2D images of the scene, then the captured images are digitized by the digital image acquisition step 15 to yield digital image components. With those digital image components, image coding and image registration are performed by the image processing step 20 to give a corresponding set of compressed images and registration parameters. The derived compressed images and registration parameters are stored in a storage step 25 on a disk (not shown) for later use or for transmission.

Upon receiving the compressed images and registration parameters by the user, the compressed images are decoded and combined with the registration parameters in a HIP processing step 30 to construct the heterogeneous image pyramid (HIP). Furthermore, the HIP representation enables construction of the digital image composite, which is dependent on the user input. Upon updated user inputs, a new digital image composite is derived and the image is rendered on the screen by the display step 35.

Figure 3:
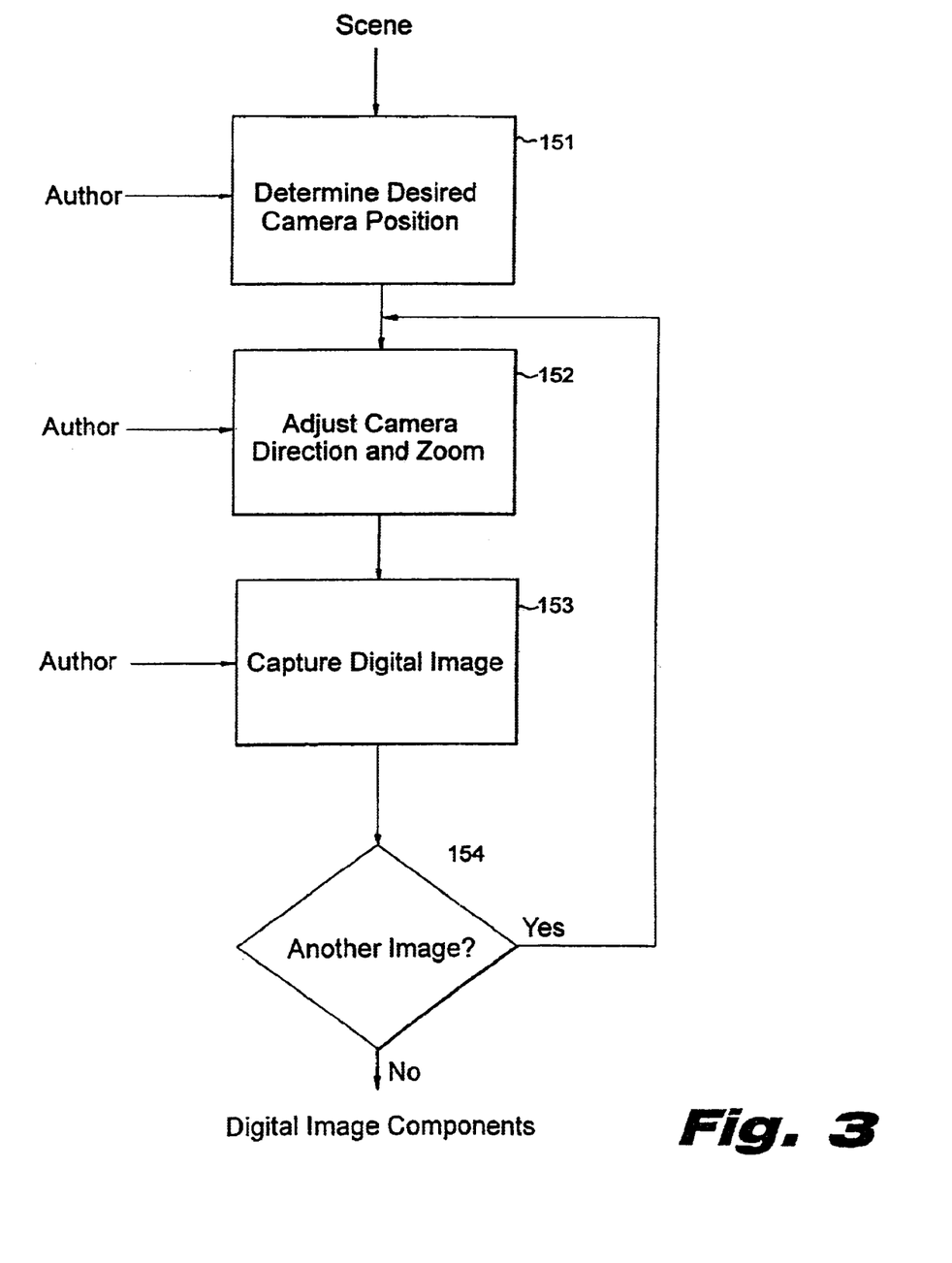
FIG. 3 is a detailed block diagram of the digital image acquisition step.

FIG. 3 illustrates a detailed block diagram depicting the digital image acquisition step 15. As shown in FIG. 3, the author who is a photographer and an image digitizer, is allowed to capture a 3D World scene and output a set of digital image components. First, at step 151, the author selects a position for the camera device to capture the best viewpoint of the scene. After setting and fixing the camera position, the author at step 152 adjusts the camera direction and camera zoom. The camera direction includes the camera pan, tilt, and revolution. Next, at step 153, the author allows the camera device to capture an image of the selected scene and, if necessary, digitally scan the image to yield a digital image component.

Finally, in step 154, the author determines if another digital image of the scene is desired. If another image is wanted, then the author returns to step 152 to adjust the camera direction and camera zoom using the fixed camera position. Subsequently, the author captures a new digital image and this process is repeated, resulting in a collection of digital image components. Thus the collection of digital image components is an author selected set of desired views of the same scene which may be of different image sizes, different pixel resolutions, and different spatial locations, however having some degree of spatial overlap.

In the preferred mode of operation, after determining the desired camera position, the author adjusts the camera direction and zoom so that an image encompassing the whole target scene can be captured, usually resulting in a fairly low resolution digital image. Then depending on where the areas of interest or importance are in the scene, the author adjusts the camera direction and vary the camera zoom to obtain higher resolution digital images. Keeping in mind that the camera direction and zoom may be adjusted to capture the desired digital images, the camera position must not be changed. Thus the resulting collection of digital image components captures the author selected set of resolutionally non-uniform representations of the desired scene. In that desired scene, higher resolution digital images may be taken of higher detailed or more important sections of the scene, and lower resolution digital images may be taken of lower detailed or less important sections.

As an example, when capturing a resolutionally non-uniform collection of digital image components of an ordinary textbook cover, the author may first determine the optimal viewpoint of the CCD camera device and fixes the camera to that position. After adjusting the camera direction and zoom, one low resolution digital image is captured of the whole book cover. Next, the author focuses the camera toward the textbook title by slightly rotating the camera direction and increasing the camera zoom to capture a higher resolution digital image of the title text. Then, the author focuses the camera towards the textbook author's name by readjusting the camera direction and modifying the camera zoom to capture another high resolution digital image of the author's name. Those three digital image components represent a resolutionally non-uniform distribution of multiple resolution scene data. Due to the nature of the CCD camera device, the digital image components of the resulting collection are of the same fixed image size and the same spatial resolution, however pixel magnifications and spatial locations are different.

Figure 4:
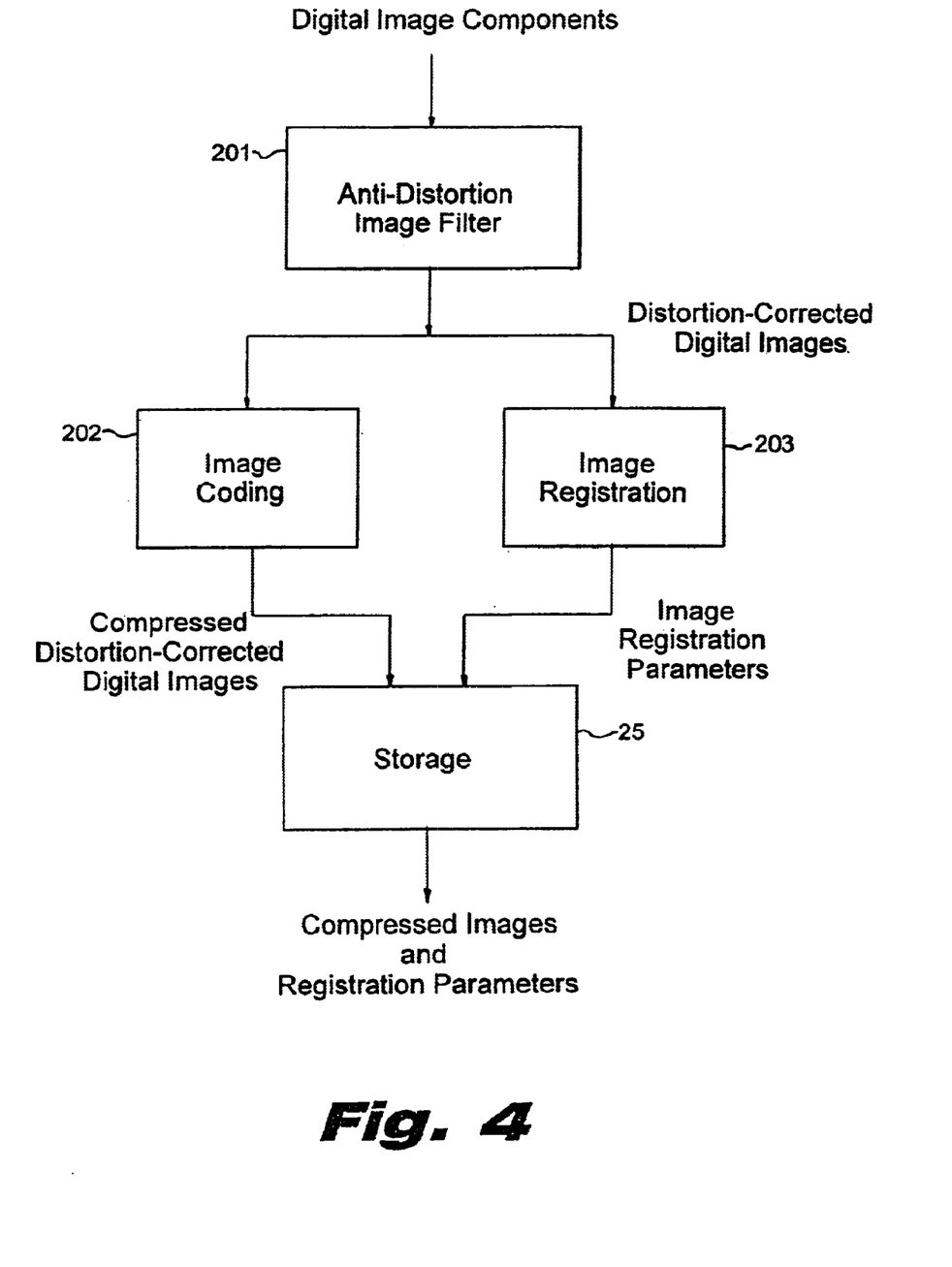
FIG. 4 is a detailed block diagram of the image processing step.

FIG. 4 illustrates the details of the image processing step 20. As FIG. 4 shows, the digital image components are processed to compute a corresponding set of compressed images and registration parameters. An anti-distortion image filter is employed at step 201 to correct any undesirable non-linear optical distortions resulting from most image acquisition devices. Image registration does not work well when the images are affected by lens distortions. Barrel or pin-cushion distortion may be generated by inexpensive video-conferencing cameras having short focal length lenses. Object features far away from the optical axis known to be straight are imaged as curved lines. In other applications such as remote sensing, lens distortion is much less severe. In any event, an anti-distortion image filter obtained from a camera calibration is highly desirable. The anti-distortion image filter is used to calibrate and rectify all the digital image components, resulting in a corresponding collection of distortion-corrected digital images.

Referring to FIG. 4, at the image coding step 202 the distortion-corrected digital images are compressed for storage and retrieval purposes, yielding a corresponding set of compressed distortion-corrected digital images. The image coding stage may represent any form of image compression for disk space constrained storage limitations. Two examples are the wavelet image compression and the discrete cosine transform based JPEG compression.

Simultaneously, in an image registration step 203, the distortion-corrected digital images are analyzed to derive a corresponding set of image registration parameters. The image registration output assumes a parameterized transform from one digital image to another. One such transformation is the affine image transformation $$r2 = A*r1 + b,$$

where r2 is the transformed two-dimensional image vector; r1 the given image vector; and A and b are parameters. In a simple case, the two images may be linearly shifted versions of each other. Another example is the known homographic transformation.

$$r2 = (A*r1 + b)/c*r1 + 1 ),$$

The latter transformation and other more general transformations handle perspective as well. The image registration problem determines a set of parameters that minimizes a distance metric mismatch defined for a reference image and its transformed counterpart.

Finally, the collection of compressed distortion-corrected digital images and their corresponding image registration parameters are saved in storage for later retrieval as compressed images and registration parameters at step 25.

Figure 5:
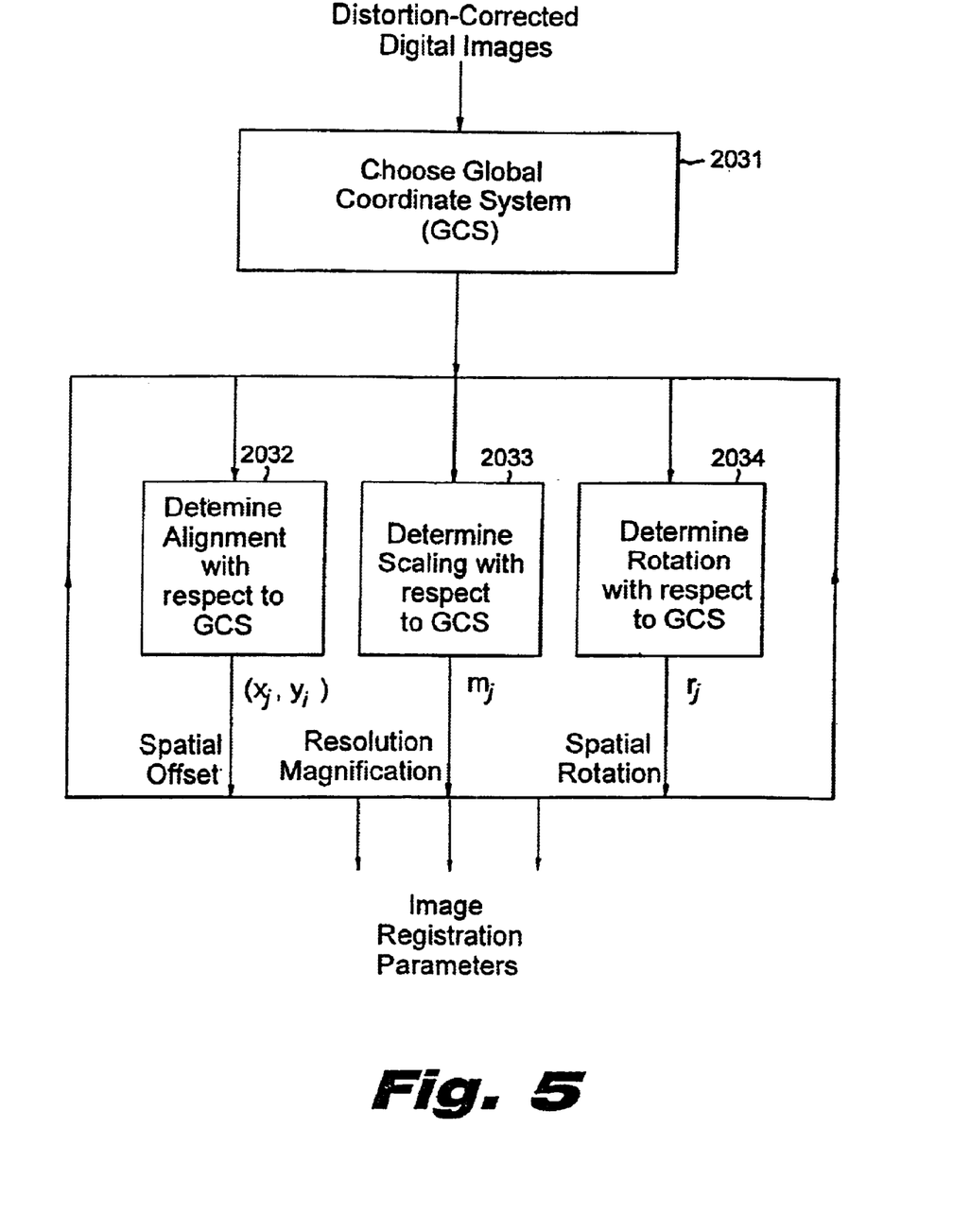
FIG. 5 is a detailed block diagram of the image registration step.

As shown in FIG. 5, the parameterized transforms are determined from each distortion-corrected digital image to a reference coordinate system, yielding a corresponding set of image registration parameters. For the inventive digital image acquisition system where the camera position is fixed, the parameterized transforms include but are not limited to the spatial offset determined at step 2032, spatial rotation determined at step 2033, and resolution magnification determined at step 2034 for each digital image relative to some reference coordinate system.

The image coordinate system (ICS), denotes ICS (u,v) a discrete 2D coordinate system with orthogonal u-axis and v-axis, where u and v are discrete and integral. For a digital image with index j, denoted $I_j$, let $ICS_j$ (u,v) be its image coordinate system and $I_j$ (u,v) be its image pixel intensities, where u ranges from 0 to (M−1) and v ranges from 0 to (N−1) for an M×N image size. Furthermore, for a total collection of J digital images, index j ranges from 1 to J.

The GCS is chosen to be the reference coordinate system corresponding to the Cartesian image coordinate system of the lowest resolution digital image, i.e., the image taken with the lowest zoom magnification. Consequently, the global coordinate system denoted by GCS (x,y) is a discrete 2D coordinate system with orthogonal x-axis and y-axis, where x and y are discrete but not necessarily integral, with horizontal scale unit x=1 corresponding to that of u=1 and vertical scale unit y=1 corresponding to that of v=1 of the lowest zoom magnification digital image I (u,v).

After determining the global coordinate system, each distortion-corrected digital image $I_j$ is iteratively analyzed against the reference coordinate system to determine its spatial offset, spatial rotation, and resolution magnification. The spatial offset ($x_j$, $y_j$) for digital image $I_j$ corresponds to the translation component of the image coordinate system $ICS_j$ (u,v) relative to the origin of the global coordinate system GCS (x,y). The spatial rotation $r_j$ corresponds to the rotational component of the image coordinate system $ICS_j$ (u,v) relative to the orthogonal axes of the global coordinate system GCS (x,y). The resolution magnification $m_j$ for digital image $I_j$ corresponds to the scaling components of the image coordinate system $ICS_j$ (u,v) relative to the unit scale of the global coordinate system GCS (x,y).

Figure 6:
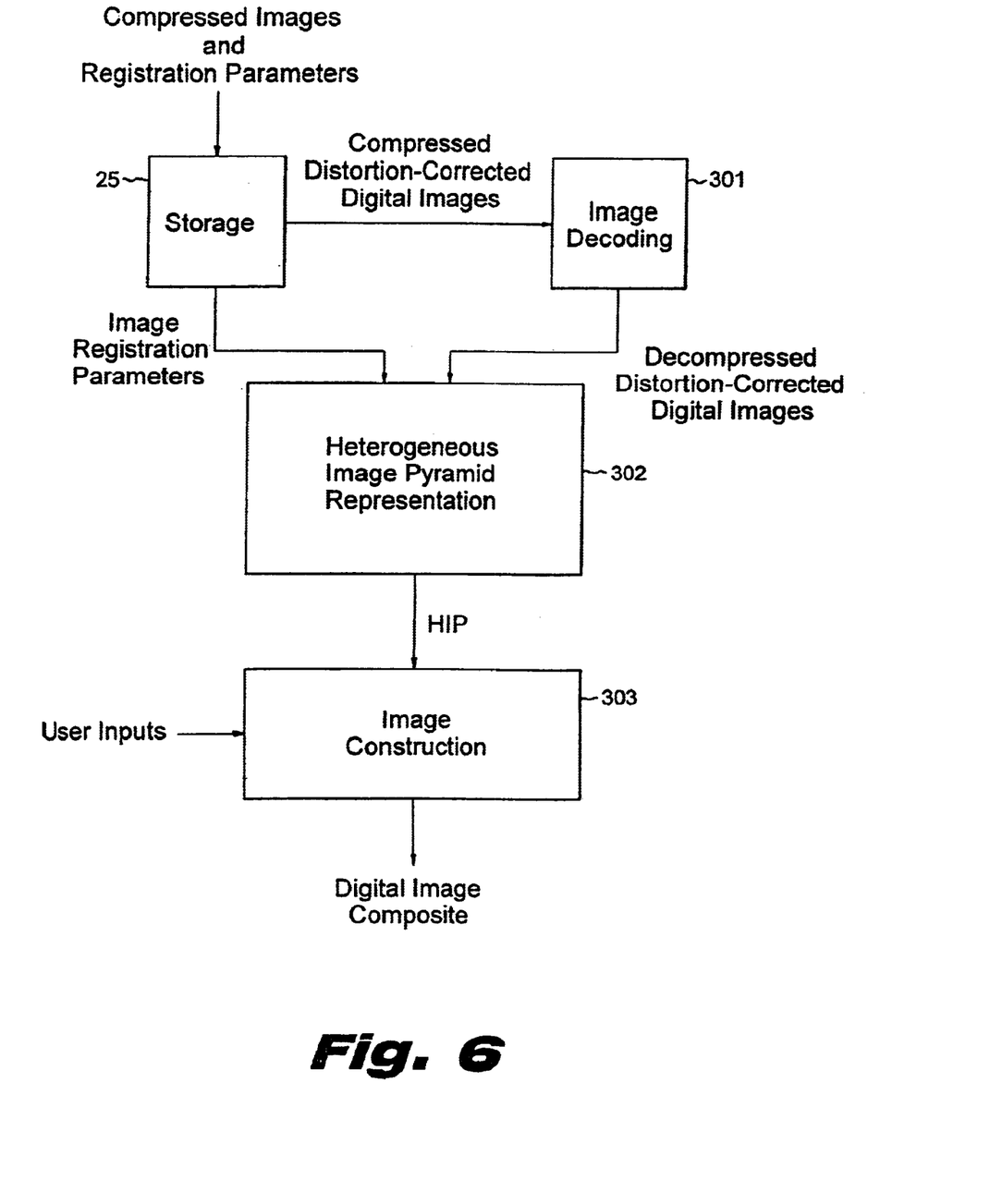
FIG. 6 is a detailed block diagram of the Heterogeneous Image Pyramid processing step.

As shown in FIG. 6, the compressed images and registration parameters are received from the storage step 25 (FIG. 2) and the digital image composites dependent on the user inputs are generated. Initially, the compressed distortion-corrected digital images are uncompressed in the image decoding step 301 to yield the decompressed distortion-corrected digital images. The image registration parameters and the decompressed distortion-corrected digital images are combined by the HIP representation step 302 and a data structural representation referred to as the HIP is constructed. The image construction step 303 uses the HIP and the user inputs to generate a digital image composite for the screen display to reflect every user response.

Figure 7A:
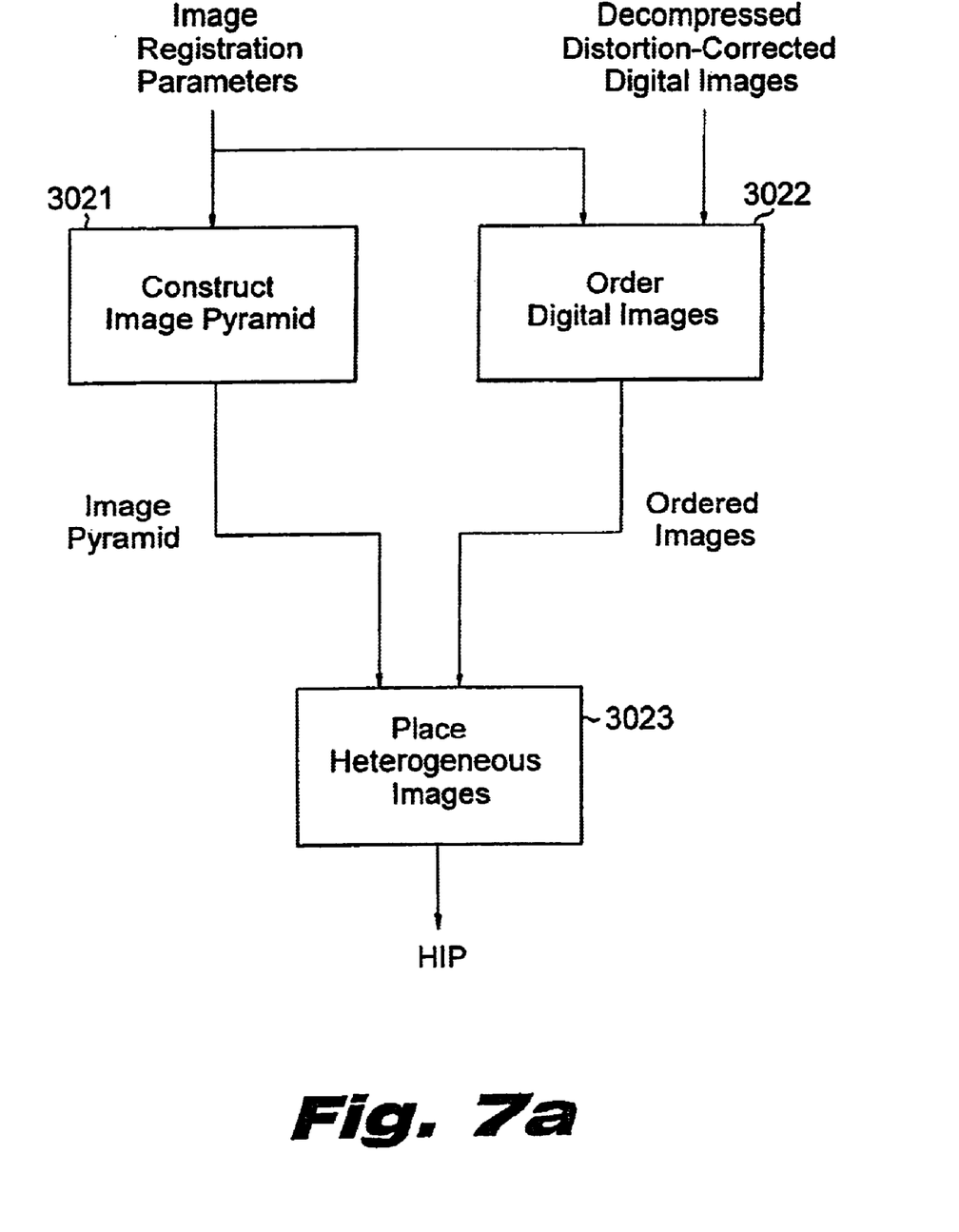
FIG. 7a is a detailed block diagram of the Heterogeneous Image Pyramid representation step.

As FIG. 7a shows, the HIP image structural representation is composed and generated from the collection of decompressed distortion-corrected digital images and their corresponding image registration parameters. The HIP representation maintains and manages the different levels of resolution magnification images with different spatial offsets and spatial rotations. The foundation of the HIP is an image pyramid built in the construct image pyramid step 3021 using the image registration parameters. Simultaneously, the decompressed distortion-corrected digital images are ordered in the order digital images step 3022 using the respective image registration parameters, resulting in a set of ordered images. Finally, the ordered images are placed in the image pyramid, shown in FIG. 7b, in the place heterogeneous images step 3023 to construct the HIP.

The ordering and indexing of the decompressed distortion-corrected digital images is performed by the order digital images step 3022 (FIG. 7a). The image registration parameters for each digital image $I_j$ provide the spatial offset ($X_j$, $y_j$), the spatial rotation $r_j$, and the resolution magnification $m_j$ for the corresponding image coordinate system $ICS_j$ (u,v) with respect to the global coordinate system GCS (x,y). Using the image registration parameters, the decompressed distortion-corrected digital images $I_j$ are ordered according to their resolution magnification $m_j$, where the digital image with the lowest resolution magnification is assigned to be the image with the lowest index j=1. Thus digital images $I_1$, $I_2$, $I_3$, . . . , $I_J$ are ordered with respective increasing resolution magnifications $m_1$, $m_2$, $m_3$, . . . , $m_J$. Following without loss of generality, the resolution magnifications are normalized such that the lowest resolution magnification is equal to one, $m_1=1$. This can be achieved by dividing each resolution magnification $m_j$ by the lowest resolution magnification $m_1$.

For the formulation of the multi-variable image pyramid as represented by the construct image pyramid block 3021, three axes and their scale units need to be defined. Two orthogonal axes are defined to correspond to those of the global coordinate system GCS (x,y) and are denoted by variables x' and y'. The third orthogonal axis is defined to be the resolution magnification, and is denoted by variable m'. The volumetric image pyramid denoted by IP (x',y',m') is a 3D coordinate system where (x',y') corresponds to the global coordinate system and m' corresponds to the resolution magnification. The relationship between the global coordinate system GCS (x,y) and the image pyramid is subject to the following constraints: x'=m'* x and y'=m'* y. Thus the transformations from the global coordinate system to be image pyramid coordinate system is given by:

$$\begin{vmatrix} x' \\ y' \\ m' \end{vmatrix} = m' \begin{vmatrix} x \\ y \\ 1 \end{vmatrix}$$

Consequently for limited ranges of variables x and y, the ranges of variables x' and y' are directly proportional and linearly increasing with respect to the resolution magnification variable m', yielding a pyramidal volume along the m' axis.

Figure 7B:
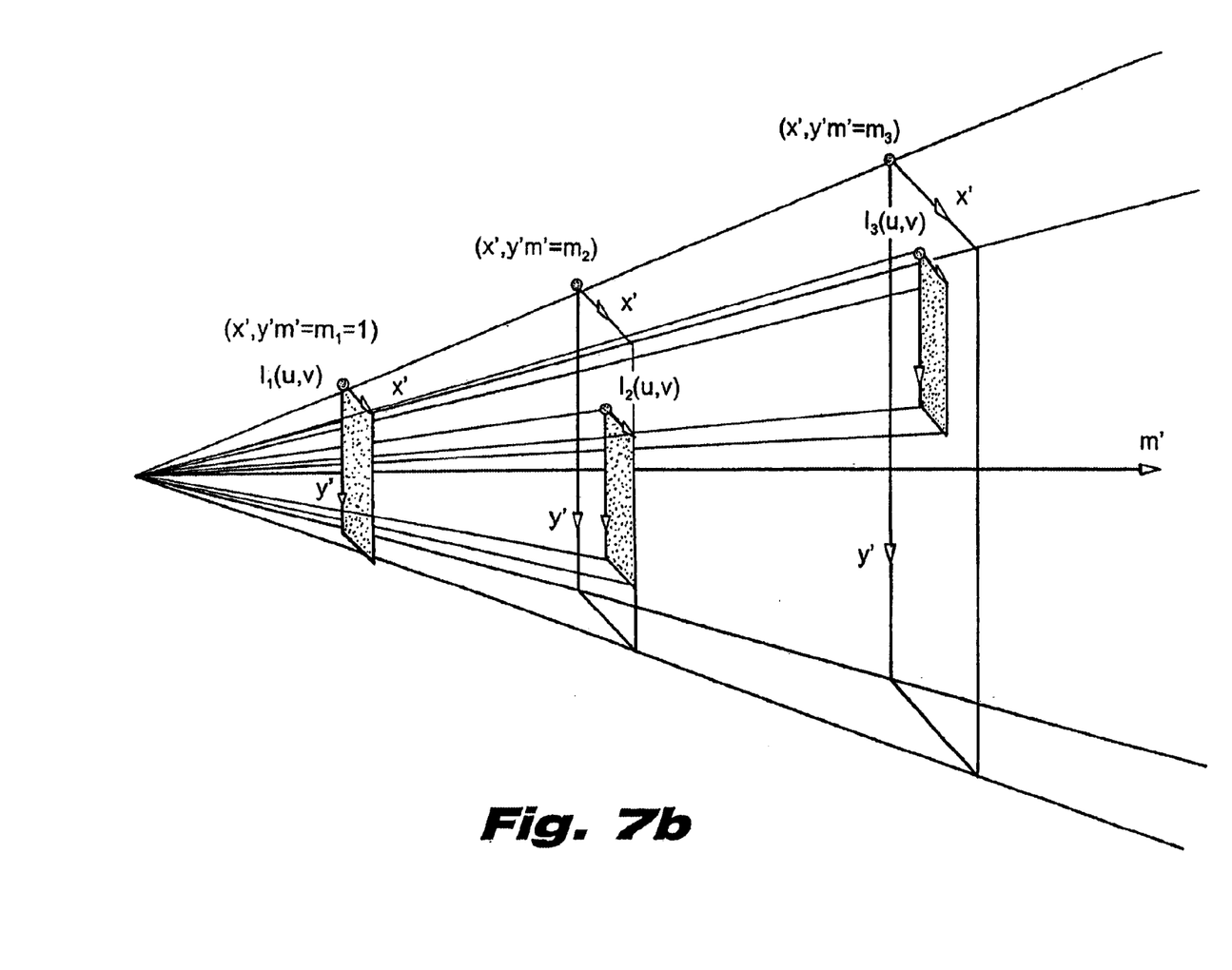
FIG. 7b is a graphical representation of a Heterogeneous Image Pyramid.

Having defined the image pyramid, the set of ordered images is incrementally placed in the volumetric pyramid representation as described by the place heterogeneous images block. For each ordered image $I_j$, starting with that of the lowest resolution magnification, namely $I_1$, and increasing in index j, the digital image $I_j$ is copied into the image pyramid such that the image coordinate system $ICS_j$ (u,v) is transformed to the image pyramid coordinate system $IP_j$ (x',y',m') using its image registration parameters resulting in the image pyramid intensity $IP_j$ (x',y',m') for digital image $I_j$.

Consider for example a digital image $I_1$ with image coordinate system $ICS_1$ (u,v) and spatial offset $(x_1, y_1)$=(0, 0), spatial rotation $r_1$=0, and resolution magnification $m_1$=1, discrete image intensities $I_1$ (u,v) for u ∈ [0,M] and v ∈ [0,N] are copied onto the volumetric pyramid at the image pyramid coordinates $IP_1$ (x'=u, y'=v, m'=$m_1$=1). For digital image $I_j$, with image coordinate system $ICS_j$ (u,v), spatial offset $(x_j, y_j)$, spatial rotation $r_j$=0, and resolution magnification $m_j$, discrete image intensities $I_j$ (u,v) for u ∈ [0,M] and v ∈ [0,N] are copied onto the volumetric pyramid resulting in the image pyramid intensity $IP_j$ (x', y',m'=$m_j$) such that:

$$IP_j(x',y',m'=m_j)=I_j(u=x'-m_jx_j,v=y'-m_jy_j).$$

The mathematical formulae for converting the discrete image coordinate system $ICS_j$ (u,v) of digital image $I_j$ and the continuous image pyramid coordinate system IP(x',y',m') is given by the following coordinate transformation:

$$\begin{vmatrix} x' \\ y' \\ m' \end{vmatrix} = m_j \begin{vmatrix} x \\ y \\ 1 \end{vmatrix} = \begin{vmatrix} u \\ v \\ m_j \end{vmatrix} + m_j \begin{vmatrix} x_j \\ y_j \\ 0 \end{vmatrix}$$

The sum of placing all the resolutionally heterogeneous ordered digital images onto the image pyramid generates an HIP which may be represented as:

$$HIP = \sum_j IP_j(x', y', m')$$

Figure 8:
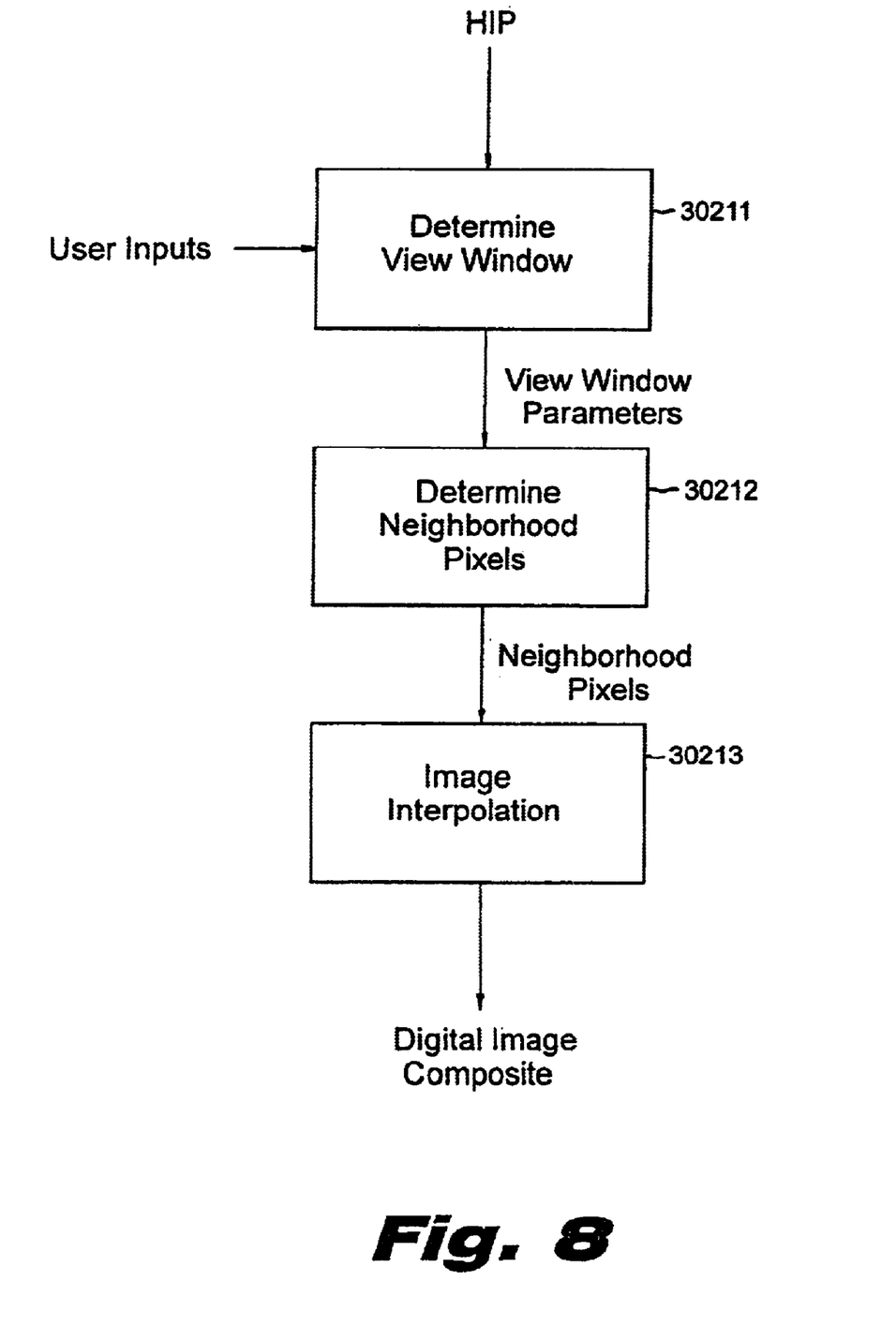
FIG. 8 is an image construction diagram of the inventive system.

As shown in FIG. 8, one digital image composite for every user input is generated out of the HIP. The user input reflects the desired display view of the user. Each user input is used to determine in the determine view window step 30211 the view window parameters for the display, relative to the HIP coordinate system. Having determined the view window parameters, a window of neighborhood pixels around the desired display view on the HIP is defined in the determine neighborhood pixel step 30212. The neighborhood pixels define a window of pixel data on which the construction of the final digital image composite is effectively dependent upon. With these neighborhood pixels, the digital image composite is constructed in the image interpolation step 30213 through the image re-sampling process. The determination of the specific collection of neighborhood pixels is dependent on the accompanying image interpolation process as will be hereinafter described in general detail.

User input may include response from the user to change display views, like magnification zooms and spatial displacements. The general functionality of the user inputs is to define the desired display view, whether it is an ordinary rectangular perspective image of some 3D scene or a wide-lens distorted circular image of the same 3D scene. Thus, the determine view window step 30211 converts any form of user inputs to derive the appropriate view window parameters relative to the HIP coordinate system. For the ordinary case of rectangular digital images with uniform spatial magnification, as is the case for most images found in the media, the desired action to zoom in and/or translate the images is usually available to the user.

To represent such actions as window parameters view, the display coordinate system (DCS) on which the final digital image composite is to be displayed, must first be defined. The display coordinate system DCS (s,t), is a two dimension discrete coordinate system with variables s and t to represent the two orthogonal axes. Subsequently, let z denote the user-selected display zoom and (Δs, Δt) the user-selected display offset. Corresponding to the display coordinate system, let the discrete image composite be denoted by DIC (s,t) where the horizontal display axis s ranges in value from 0 to (S−1), and the vertical display axis t ranges in value from 0 to (T−1) for an image display size of S×T pixels.

The view window parameters determine which part of the image and at what magnification the final digital image composite is displayed. Having determined the view window parameters, sets of pixels from the input digital image components are used in the determine neighborhood pixels step 30212 to contribute to the desired display view. The view window parameters are indexed relative to the HIP coordinate system, and thus also determine the relevant spatial ranges of pixel data from the digital image components residing in the HIP. For each digital image component, a window of its pixel data is determined to contribute to the final display view. The collection of pixel data from the HIP is referred to as the neighborhood pixels. It is these neighborhood pixels and their corresponding positions in the HIP that determines the final output.

The final digital image composite is determined, at step 30211, through the process of interpolation of the collection of neighborhood pixels. The positions of these neighborhood pixels define each pixel's spatial offset and resolution magnification, and it is the combination of these parameters with the pixel values themselves that the final digital image is derived. The image interpolation stage may include one or a combination of the following processes:

Up-interpolation is the term used for generating one digital image of higher resolution magnification given one or more sources of digital images of lower resolution magnifications. One trivial example of an up-interpolation process is the implementation of an image up-sampling filter with one image input and one image output.

Down-interpolation is the reverse magnification process. The term is used for generating one digital image of lower resolution magnification given one or more sources of digital images of higher resolution magnifications. One example of a down-interpolation process is the implementation of an image down-sampling filter with one image input and one image output.

Bi-interpolation is the combination of the up-interpolation and down-interpolation processes. The term is used to generate one digital image given multiple sources of digital images of both higher and lower resolution magnifications. One example of a bi-interpolation process is the implementation of an image warping filter with two extreme image inputs and the generation of an intermediate image output.

Spatial transformation performs the desired mapping function between discrete pixel positions of one digital image to another image. Spatial transformation may for instance be performed on the pixel data of digital image components residing in the HIP to the output pixels of the final display image.

A reconstruction stage may be introduced to construct the continuous surface through these image data, since the pixel values residing in the HIP provide only discrete image data at integral positions. The continuous surface may be resampled at any arbitrary spatial offset, spatial rotation, and resolution magnification. Subsequently, because aliasing artifacts are evident when spatial image magnification and reduction are performed, an anti-alias image filter may be inserted to reduce the effect of under-sampling.

After the image interpolation block, the digital image composite output is rendered on the display device at the user specified display size, spatial offset, spatial rotation, and resolution magnification.

For the formulation of the digital image composite DIC (s,t) from the HIP, we need to define the relationship between the view window parameters of the user inputs and the display coordinate system. Assume that the view window parameters consist of z as the user-selected display zoom and ($\Delta s$, $\Delta t$) as the user-selected display offset. Since the HIP is the collection of resolutionally ordered digital images placed in the image pyramid at their respective resolution magnification, as represented by the following:

$$HIP = \sum_j IP_j(x', y', m' = m_j)$$

The pixel data of each digital image component residing at some specific resolution magnification of the HIP may contribute to the final digital image composite. The spatial coordinate transformation between the image pyramid coordinate system IP (x',y',m') and the display coordinate system DCS (s,t) may be related as follows:

$$\begin{vmatrix} s \\ t \end{vmatrix} = \frac{z}{m'} \begin{vmatrix} x' \\ y' \end{vmatrix} - \begin{vmatrix} \Delta s \\ \Delta t \end{vmatrix}$$

This equation thus defines the required neighborhood pixels from each digital image component because s and t are discrete and bounded by:

$$s \in [0,S) \text{ and } t \in [0,T).$$

Next, the image interpolation step 30213 defines the required combination of pixel data to formulate the final digital image composite. As a trivial example, the digital image composite D1C (s,t) is the result of resampling some weighted combination of the spatially transformed digital image components.

$$DIC(s, t) = \sum_j a_j * IP_j\left(x' = \frac{m_j}{z}(s + \Delta s), y' = \frac{m_j}{z}(t + \Delta t), m' = m_j\right) * W\left(\frac{m_j}{z}(s + \Delta s), \frac{m_j}{z}(t + \Delta t)\right),$$

Subsequently for the special case where the user-selected display zoom corresponds to the constant resolution magnification of digital image j, z=$m_j$, then it is desirable that digital image component $IP_j$ (x', y',m'=$m_j$) determines the final digital image composite DIC (s,t) to be displayed, according to the following formula:

$$DIC(s,t) = IP_j(x'=s+\Delta s, y'=t+\Delta t, m'=m_j) * W(s+\Delta s, t+\Delta t)$$

Furthermore, it will be understood by those skilled in the art that the invention is well suited to be used to pre-compute the desired levels of resolutions of texture for texture mapping.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. A system for collecting and using plural images of target object to allow a user to view selected regions of said target object with increasing degree of resolution and detail, said system comprising:
    an image acquisition means for acquiring one image of the entire target object at a relatively low resolution, and for acquiring at least one additional image of a particular area of the target object and at a relatively high resolution;
    a first processing means for determining image registration parameters of each of said images relative to a defined coordinate system;
    a second processing means for constructing a pyramidal representation of said images;
    a third processing means for creating a composite image of said target object using said pyramidal representation; and
    a display means for displaying said composite image while allowing said user to view selected regions of said target object with an increasing degree of resolution and detail.

2. The system of claim 1, wherein said image acquisition means comprises:
   a. a means for determining a desired position of a camera according to an author's preferences;
   b. a means for adjusting a direction and zoom of said camera according to said author's preferences;
   c. a means for capturing an image by photographing said target object; and
   whereby steps (b) and (c) are repeated for each image requested by said author.

3. The system of claim 2, wherein said image acquisition means accepts the following parameters:
   number of image inputs, resolution magnitudes, and image importance.

4. The system of claim 2, wherein said determined desired position of said camera is fixed.

5. The system of claim 1, wherein said first processing means further comprises means for compressing said images and for storing said compressed images and registration parameters.

6. The system of claim 1, wherein said first processing means further comprises means for calibrating and rectifying said images and for creating a corresponding collection of distortion-corrected images.

7. The system of claim 6, wherein said first processing means determines said registration parameters of said distortion-corrected images for a Global Coordinate System by determining alignment, scaling and rotation of said distortion-corrected images with respect to said Global Coordinate System.

8. The system of claim 1, wherein said second processing means sorts, orders and places said images according to said registration parameters.

9. The system of claim 8, wherein said second processing means re-orders said images of said constructed pyramidal representation according an editor's preferences.

10. The system of claim 9, wherein said pyramidal representation accommodates different resolution magnification and different spacial offset, rotation, overlap, size and shape images.

11. The system of claim 10, wherein said images are sparsely resident anywhere in said pyramidal representation and are not confined to quantized levels.

12. The system of claim 10, wherein said third processing means dynamically generates one composite image for each user-selected view display to allow said user to continuously change view display, zoom in on image, translate said image, rotate said image, view said image through different lens perspectives.

13. The system of claim 12, wherein said third processing means dynamically generates a set of quantized composite images for texture mapping and allows pre-storage of required levels of texture maps.

14. The system of claim 9, wherein said third processing means creates said composite image using a view window, neighborhood pixels, and image interpolation.

15. A method for collecting and using plural images of a target object to allow a user to view selected regions of said target object with an increasing degree of resolution and detail, said method comprising the steps of:
   acquiring one image of the entire target object at a relatively low resolution, and acquiring at least one additional image of a particular area of the target object and at a relatively high resolution;
   determining image registration parameters of each of said images relative to a defined coordinate system;
   constructing a pyramidal representation of said images;
   creating a composite image of said target object using said pyramidal representation; and
   displaying said composite image while allowing said user to view selected regions of said target object with an increasing degree of resolution and detail.

16. The method of claim 15, wherein said acquiring step comprises the steps of:
   a. determining a desired position of a camera according to an author's preferences;
   b. adjusting a direction and zoom of said camera according to said author's preferences;
   c. capturing an image by photographing said target object; and
   repeating steps (b) and (c) for each image requested by said author.

17. The method of claim 16, wherein said acquiring step accepts the following parameters: number of image inputs, resolution magnitudes, and image importance.

18. The method of claim 16, wherein said determined desired position is fixed.

19. The method of claim 15, wherein said determining step further comprises steps of compressing said images; and storing said compressed images and said registration parameters.

20. The method of claim 15, wherein said determining step further comprises a step of calibrating and rectifying said images to create a corresponding collection of distortion-corrected images.

21. The method of claim 20, wherein said determining step includes the step of determining said registration parameters of said distortion-corrected images for a Global Coordinate System by determining alignment, scaling and rotation with respect to said Global Coordinate System.

22. The method of claim 15, wherein said constructing step includes the step of sorting, ordering and placing said images according to said registration parameters.

23. The method of claim 22, wherein said constructing step includes the step of re-ordering said images of said constructed pyramidal representation according to an editor's preferences.

24. The method of claim 23, wherein said composite image is created using a view window, neighborhood pixels, and image interpolation.

25. The method of claim 23, wherein said pyramidal representation accommodates different resolution magnification and different spacial offset, rotation, overlap, size and shape images.

26. The method of claim 25, wherein said images are sparsely resident anywhere in said pyramidal representation and are not confined to quantized levels.

27. The method of claim 25, wherein said creating step dynamically generates one composite image for each view display selected by said user to allow said user to continuously change view display, zoom in on an image, translate said image, rotate said image, view said image through different lens perspectives.

28. The method of claim 27, wherein said creating step dynamically generates a set of quantized composite images for texture mapping and allows pre-storage of required levels of texture maps.

29. A computer program device readable by a machine, tangibly embodying a program of instructions executable by a machine to perform method steps for collecting and using plural images of a target object to allow a user to view selected regions of said target object with an increasing degree of resolution and detail, said method comprising the steps of:

acquiring one image of the entire target object at a relatively low resolution, and acquiring at least one additional image of a particular area of the target object and at a relatively high resolution;

determining image registration parameters of each of said images relative to a defined coordinate system;

constructing a pyramidal representation of said images;

creating a composite image of said target object using said pyramidal representation; and displaying said composite image while allowing said user to view selected regions of said target object with an increasing degree of resolution and detail.

30. The computer program device of claim 29, wherein said acquiring step comprises the steps of:
   a. determining a desired position of a camera according to an author's preferences;
   b. adjusting a direction and zoom of said camera according to said author's preferences;
   c. capturing an image by photographing said target object; and
   repeating steps (b) and (c) for each image requested by said author.

31. The computer program device of claim 30, wherein said acquiring step accepts the following parameters:
   number of image inputs, resolution magnitudes, and image importance.

32. The computer program device of claim 30, wherein said determined desired position is fixed.

33. The computer program device of claim 29, wherein said determining step further comprises steps of compressing said images; and storing said compressed images and said registration parameters.

34. The computer program device of claim 29, wherein said determining step further comprises a step of calibrating and rectifying said images to create a corresponding collection of distortion-corrected images.

35. The computer program device of claim 34, wherein said determining step includes the step of determining said registration parameters of said distortion-corrected images for a Global Coordinate System by determining alignment, scaling and rotation with respect to said Global Coordinate System.

36. The computer program device of claim 29, wherein said constructing step includes the step of sorting, ordering and placing said images according to said registration parameters.

37. The computer program device of claim 36, wherein said constructing step includes the step of re-ordering said images of said constructed pyramidal representation according to an editor's preferences.

38. The computer program device of claim 37, wherein said pyramidal representation accommodates different resolution magnification and different spacial offset, rotation, overlap, size and shape images.

39. The computer program device of claim 38, wherein said images are sparsely resident anywhere in said pyramidal representation and are not confined to quantized levels.

40. The computer program device of claim 38, wherein said creating step dynamically generates one composite image for each view display selected by said user to allow said user to continuously change view display, zoom in on an image, translate said image, rotate said image, view said image through different lens perspectives.

41. The computer program device of claim 40, wherein said creating step dynamically generates a set of quantized composite images for texture mapping and allows pre-storage of required levels of texture maps.

42. The computer program device of claim 37, wherein said composite image is created using a view window, neighborhood pixels, and image interpolation.

* * * * *